United States Patent Office 2,772,368
Patented Nov. 27, 1956

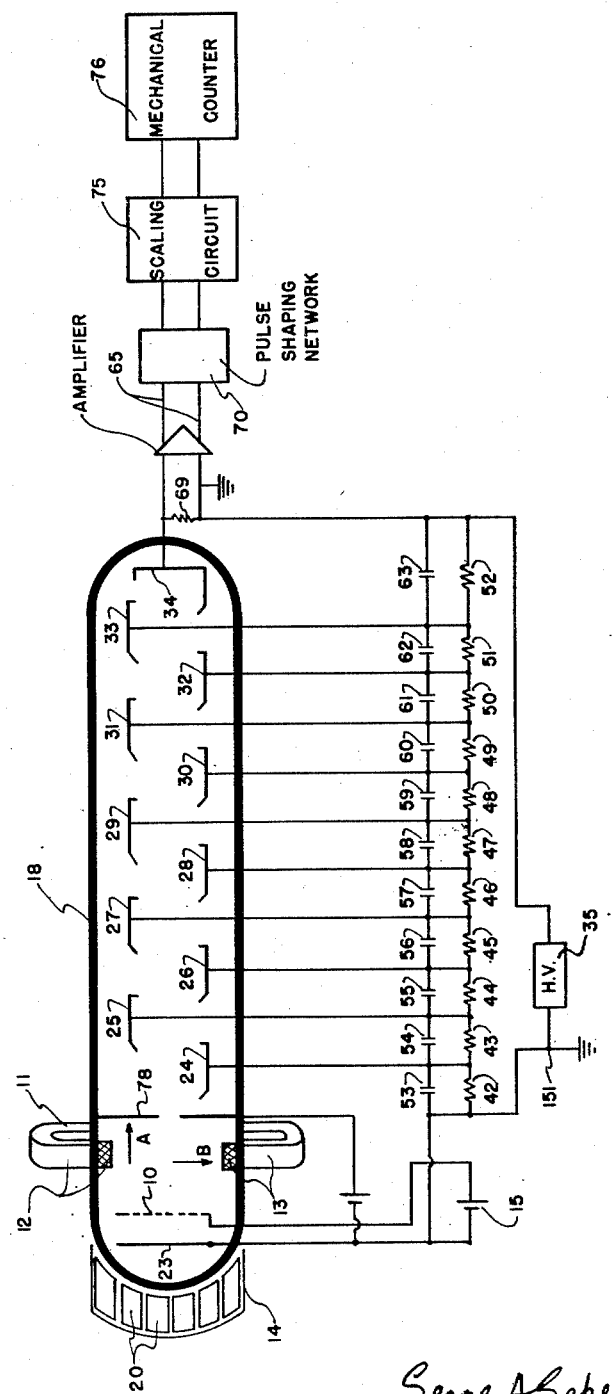

2,772,368

HIGH TEMPERATURE SCINTILLOMETER

Serge A. Scherbatskoy, Tulsa, Okla., assignor to Perforating Guns Atlas Corporation, Houston, Tex., a corporation of Delaware Application August 10, 1951, Serial No. 241,176

1 Claim. (Cl. 250—207)

This invention relates to a scintillation counter for measuring the intensity of such radiation as alpha, beta, gamma rays, or any other radiations resulting from nuclear transmutations or disintegrations. More particularly, this invention relates to a scintillation counter adapted for well logging and capable of working at high temperatures. It is well known that in oil well logging high temperature conditions are frequently encountered and that any instrument used for radioactivity oil well logging must be capable of withstanding temperature of the order of 300° F. This is particularly true in deep oil wells in Texas where temperatures as high as 350° F. or even higher are encountered.

As is well known, a scintillation counter consists of a suitably chosen crystal such as anthracene or cadmium tungstate commonly designated as "phosphor" that is adapted to scintillate, i. e. to convert the incoming gamma rays (or other radiation) into impulses of light. In traversing the crystal the quantum to be detected loses its energy in exciting and ionizing the molecules of the crystal. These molecules then radiate energy in the form of visible or ultraviolet light, some of which is collected on the cathode of a multiplier tube. The cathode of the multiplier tube is provided with photoelectric surface of an element having low work function such as caesium. Such a photoelectric surface is adapted to emit electrons whenever it is exposed to the ultraviolet light, emitted by the phosphor as a result of interaction of said phosphor with the radiation to be detected. It is well known that photoelectric surfaces are responsive to an appreciable band width of rays. Although caesium is responsive to wave lengths of 5000 A. units, it should be borne in mind that it will also respond (in a decreasing fashion) to much longer wave lengths. For instance, caesium will have an appreciable response in the vicinity of 10,000 or even 12,000 A. units. For this reason it has been determined that almost all photosurfaces that are sensitive to visible or ultraviolet light are also responsive to heat and start emitting electrons when the temperature is raised.

Consequently, whenever a photomultiplier is exposed to a high ambient temperature, its photocathode spontaneously emits thermal electrons. These thermal electrons receive full amplification in the photomultiplier and are of primary importance in contributing to noise. They appear as parasitic pulses (designated as dark current) which intermingle with any radiation signals and tend to obscure them.

It is therefore the purpose of the present invention to provide a means for eliminating or decreasing the dark current in a photomultiplier in order to adapt a scintillation counter for operation at high ambient temperatures.

It is another purpose of the present invention to provide a scintillation counter for radioactivity well logging that is simple and reliable in operation.

Other objects, together with some of the advantages to be derived in utilizing the present invention, will become apparent from the following detailed description taken together with the accompanying drawing showing a detecting instrument embodying the features of my invention.

It is well known that the electrons emitted from the photocathode of an electron multiplier have an energy which is a function of the energy of the photons absorbed. Thus the electrons ejected by heat have much lower energy than the electrons ejected by visible light or ultraviolet. I therefore provide an electron optical arrangement that will deflect the lower energy electrons while allowing the high energy electrons to pass. In such a manner I am eliminating the noise effects caused by heat and provide a scintillation counter that is adapted to operate at high ambient temperatures encountered in oil wells.

Referring now more particularly to the drawing the arrangement shown therein comprises an enclosure 14, comprising suitable crystals and a photomultiplier. The crystals 20 may be disposed peripherically along the walls of the container and are preferably naphthalene, anthracene, cadmium tungstate, LiF, NaF, or $CaF_2$ activated with thallium iodide or terphenyl.

The photomultiplier is provided with a photosensitive cathode 23 and a plurality of dynodes 24—34, each at a higher potential than the potential of the preceding one. In front of the cathode I provide an electron optical arrangement that will deflect the lower energy electrons while allowing the high energy electrons to pass. Such an arrangement consists of a grid 10 placed adjacently to the cathode and a magnet 11 provided with pole pieces 12, 13 mounted inside the tube and arranged so as to create magnetic field in the direction that is substantially perpendicular to the direction of electrons emitted by the cathode 23. The dynode potentials are derived from a voltage divider circuit consisting of a high voltage supply 35 and a plurality of resistor elements 42—52, said resistor elements being individually shunted by condensers 53—63, respectively. The voltage applied across the resistors 42—52 is approximately 1100 volts. Consequently, the voltage applied across each of said resistors is approximately 100 volts. The voltage across the resistor 42 is applied between the photocathode 23 and anode 24, the voltage across the resistor 43 is applied across the anodes 24, 25 and the voltages across the resistors 44, 45, 46, 47, 48, 49, 50, 51 are applied across the anodes 25—26, 26—27, 27—28, 28—29, 29—30, 30—31, 31—32, 32—33, respectively. The voltage derived from the resistor 52 is applied across the anodes 33—34 in series with the resistor 69. The output leads 65 connect the terminals of the resistor 69 to the pulse shaping network 70. (For a description of a pulse shaping network see J. W. Coltman and Fitz-Hugh Marshall, Nucleonics 1, 1947, p. 58.) The pulse shaping network is in turn connected through the scaling circuit 75 to a mechanical counter 76.

The operation of the scintillation counter can be briefly explained as follows: Assume that a radiation particle such as gamma ray penetrates into the crystal 20 and interacts with one of its electrons. As is well known, a Compton electron is ejected as a result of such interaction, said electron losing its energy by exciting and ionizing the molecules in said crystal in the immediate neighborhood of the point of interaction. These molecules radiate energy in the form of light in all directions. These rays of light are usually focused by means of a suitable mirror upon the photocathode 23, thus forming a single pulse of photoelectrons. For the sake of clarity, the mirror has not been shown in the drawing. This pulse is then amplified by the familiar secondary emission system of the multiplier tube comprising the photocathode 23 and the dynodes 24-34, each at a higher potential than the preceding one. Each photoelectron is swept to the first dynode by a potential difference of about a hundred volts and ejects four or five secondary electrons. These in turn are swept to the second dynode and similarly multiplied by the secondary emission amplification. After eleven such stages, an avalanche of a million electrons, more or less, appears at the output of the photomultiplier tubes as a result of each initial photoelectron. We obtain then a relatively strong output pulse which is transmitted to the pulse shaping network 70, and subsequently to the mechanical counter 76.

It is thus apparent that the detection of each incoming gamma ray is accompanied by a single pulse of photoelectrons emitted by the photocathode 23, said pulse beging subsequently amplified in the output of the multiplier. Such a pulse is designated as "useful signal" and the number of such pulses per second indicates the intensity of the radiation impinging upon the crystal 20.

As stated above, the electrons constituting the "useful signal" are not the only ones emitted by the photocathode 23. The surface of the photocathode having a low work function, tends also to release electrons whenever they acquire the higher thermal velocities associated with molecular agitation even at room temperatures. Thus a dark current of 10,000 to 100,000 thermal emission electrons per second is emitted from photocathode. These electrons receive the full amplification and are of primary importance in contributing to noise. These parasitic pulses intermingle with any radiation signal and tend to obscure them.

It is thus apparent that the photocathode emits two types of electrons:

(1) The useful electrons that are extracted from the surface by the incoming photons resulting from the interaction of gamma ray with the crystal. Each of the "useful" electrons has an energy which is of the same order of magnitude as the energy of the incoming photon and may amount to several electron volts.

(2) The parasitic electrons emitted by the photosurface under the effect of high temperature and constituting the source of noise. Each of these "thermal" electrons has a relatively small energy amounting to a small fraction of an electron volt.

In order to eliminate the effects of noise, I provide in the neighborhood of the photocathode 23 "an electron filter" which has as an effect to eliminate the parasitic electrons of low energy and to transmit to the dynodes the "useful electrons" of relatively high energy.

Such an electron filter consists of the grid 10 in combination with the magnet 11 and a suitably apertured disc 78. The grid 10 placed immediately and very close to the photocathode 23 is maintained at a slight positive voltage by means of battery 15, the actual voltage developed by the battery 15 depending upon the potential impressed upon the apertured disc 78, the potential of the high voltage supply 35 and the geometry of the electrodes, as will be readily understood by those in the art. It has as effect to accelerate both the "parasitic" electrons and the "useful" electrons in the direction of the arrow A. The magnet 11 produces a field in the direction designated by the arrow B, said direction being perpendicular to the direction of the electron flow.

It is thus apparent that under the effect of magnetic field the electrons emitted by the photocathode will be deflected from their motion. The direction of the deflecting force is perpendicular to the arrows A and B, i. e. perpendicular to the plane of the drawing. Under the effect of this deflecting force, both slow and fast electrons deviate from their original trajectory along the arrow A. The direction in which these electrons deviate is perpendicular to the plane of the drawing. It is apparent that the amount of deviation is considerably larger for slow electrons than for fast electrons and is such that the slow electrons never reach the dynodes but are collected by disc 78 which constitutes a barrier means for these electrons. The fast electrons deviate comparatively less and reach the region in which the high electric field caused by the first dynode takes effect. Consequently, only the high velocity or "useful" electrons act upon the photomultiplier.

It is thus apparent that I have provided an "electron filter" which separates the high energy or "useful" electron from the low energy or "noise" electrons and thus makes it possible for a scintillation counter to operate at high ambient temperatures encountered in oil wells.

I claim:

In a photoelectric detector for translating incoming photons into electrical impulse, a photoelectric element adapted to emit electrons of relatively high energy when exposed to said incoming photons, said element also emitting thermal electrons of relatively low energy when subjected to high ambient temperatures, a control grid positioned adjacent said element and operated at a positive potential with respect thereto for accelerating both high and low energy electrons emitted by said element, electron deflecting field means positioned beyond said control grid for deflecting electrons accelerated by said control grid in inverse relation to their energies, a secondary electron emitter positioned beyond said field means, and barrier means positioned between said field means and said secondary electron emitter for preventing those electrons which are deflected more than a predetermined amount from striking said emitter, whereby said detector is rendered substantially insensitive to changes in ambient temperature.

References Cited in the file of this patent

UNITED STATES PATENTS

| | | |
|---|---|---|
| 2,284,829 | Ludi | June 2, 1942 |
| 2,473,031 | Larson | June 14, 1949 |
| 2,541,374 | Morton | Feb. 13, 1951 |
| 2,576,661 | Wouters | Nov. 27, 1951 |

FOREIGN PATENTS

| | | |
|---|---|---|
| 906,922 | France | June 4, 1945 |